A. G. NUTTING.
SAFETY DEVICE.
APPLICATION FILED DEC. 29, 1911.
1,051,251.
Patented Jan. 21, 1913.
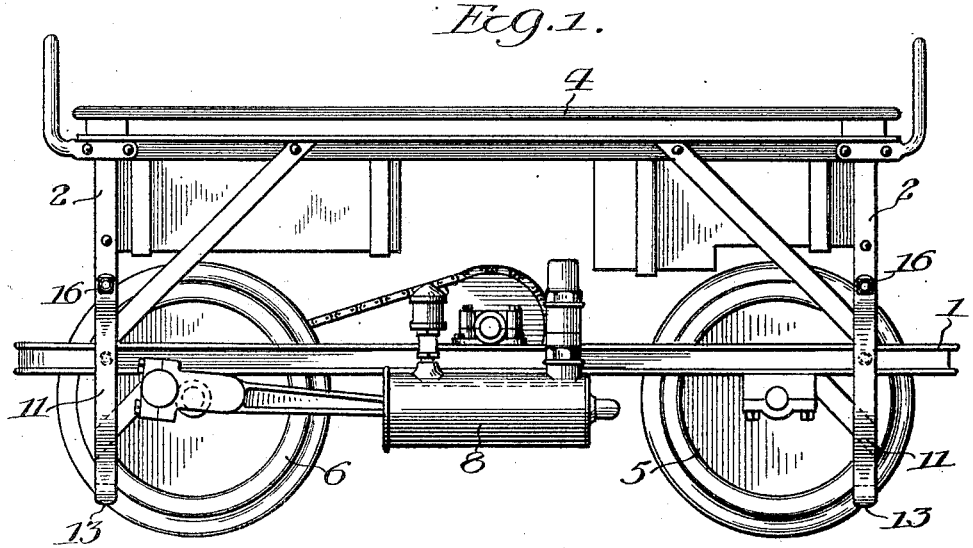
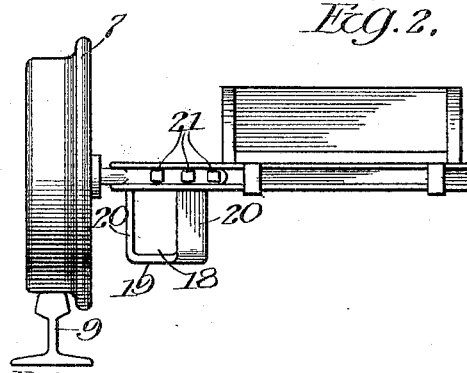
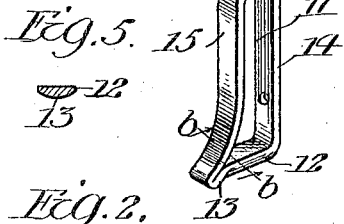
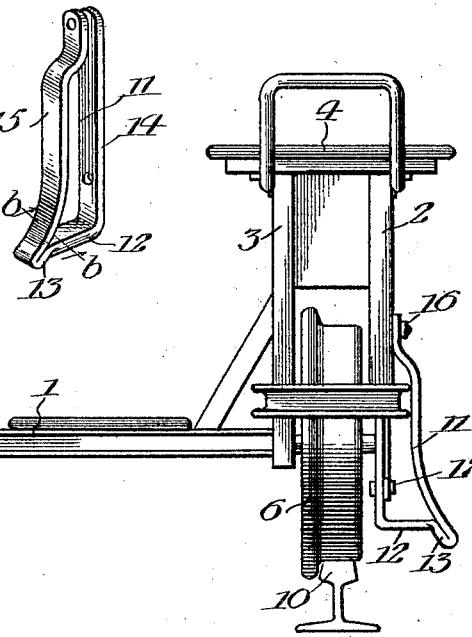
Witnesses
O. M. Hemrich
Hazel Jones
Inventor
Arthur G. Nutting
by May W. Label
Atty

UNITED STATES PATENT OFFICE.

ARTHUR G. NUTTING, OF ST. PAUL, MINNESOTA, ASSIGNOR TO CHICAGO PNEUMATIC TOOL CO., OF CHICAGO, ILLINOIS.

SAFETY DEVICE.

1,051,251.      Specification of Letters Patent.      Patented Jan. 21, 1913.

Application filed December 29, 1911. Serial No. 668,508.

*To all whom it may concern:*

Be it known that I, ARTHUR G. NUTTING, a citizen of the United States, residing at St. Paul, in the county of Ramsey and State of Minnesota, have invented a certain new and useful Improvement in Safety Devices, of which the following is a full, clear, concise, and exact description, reference being had to the accompanying drawings, forming a part of this specification.

My invention relates to safety devices and more particularly concerns itself with safety devices for cars or vehicles.

More particularly my invention is designed to provide certain devices which are available when a car jumps the track, and which devices then permit sliding of the car upon the rails, thereby to avoid injury to the car. Without the safety devices the car may bump over the ties or may leave the right of way entirely and run into some obstruction.

In the preferred form of my invention, I provide shoes which are so arranged upon the car that when the car jumps the track its shoes engage the track so as to permit the car to slide on the track and at the same time provide flanges or other suitable means to guide the car along the track.

I have found my invention of particular utility when it is applied to hand cars and the application of the invention has been particularly tested in connection with self propelled inspection cars for railroads of the three wheel variety. The invention herein is described in connection with a car of such a character. I find that a car of this character, if it jumps the track, usually jumps to that side of the track upon which the single wheel is located and the invention as applied to such a car herein is shown as providing the necessary safeguards to prevent injury to a car of this particular character.

It will of course be understood that the invention is not to be limited in its application to this specific kind of a car as the invention may be applied to other vehicles and other modifications may be made within the scope of my invention. I will however describe this specific form of my invention in connection with the accompanying drawing illustrating the same, in which:

Figure 1 is a side view of a car showing my improved safety device; Fig. 2 is a front view of the said car; Fig. 3 is a detail view of one of the safety devices; Fig. 4 is a detail view of the coöperating safety devices; and Fig. 5 is a section of the slide portion of the shoe.

The car to which my invention is shown as being applied consists of an iron framework using as a basis therefor a channel iron 1 to which suitable uprights 2, 2 and 3 are attached, which uprights permanently hold the platform 4. The car has upon one side wheels 5, 6 and upon the other side the wheel 7. The car is suitably driven by means of the explosive engine 8. The car is adapted to operate upon rails 9, 10 in the ordinary manner. Now it frequently happens that a car of this character jumps the rails and this particular form of car when jumping the rails frequently jumps in the direction toward the wheel 7. After jumping the rail the car may be liable to serious injury either in bumping over the ties or in hitting some obstruction.

My invention is designed to obviate the danger resulting from jumping of the track by providing suitable auxiliary means through the agency of which the car may be still confined to the rails after the wheels have left the same so that the car may slide along these rails without injury to the car or road bed. I might add that the devices have been found to perform their function properly even though the car jumps the track when going at a speed of twenty miles an hour.

These safety devices consist on one side of the car preferably in the form of shoes 11, 11, which shoes have the sliding surface 12 and the flange 13. The shoes are also provided with upwardly extending brackets 14 and 15 by means of which the shoe is held in place on the channel irons 2, 2 through the agency of the bolts 16 and 17. It will thus be seen that the entire shoe 11 may be made of one piece for this particular character of construction. On the opposite side of the car, as this car need be equipped only to guard against jumping toward one side, I do not find it necessary to provide a flanged foot, but provide merely a horizontally arranged sliding shoe 18 having the shoe portion 19 and two vertically extending members 20, 20 which are respectively associated with the channel iron 1 by means of the bolts 21 and 22 respectively.

Now in the operation of the device if we refer more particularly to Fig. 2, we may assume that the car jumps from the rails 9 and 10 in the direction toward the wheel 7. Now when the car thus jumps the rails, the shoes 11, 11 may engage the rail 10 and the shoe 18 comes down on top of the rail 9, and the impetus of the car carries the car along the rails as the shoes 11, 11 and 18 slide over the rails. The car is thus prevented from bumping over the ties or leaving the road bed, and after the same has been suitably brought to a stop may be restored to the rails without any serious injury having been done.

While I have herein shown and particularly described one particular form of my invention, I do not mean to limit myself to such specific description and illustration, but having thus described one form of carrying out my invention what I claim as new and desire to secure by Letters Patent is:

1. In combination with a wheeled vehicle adapted for operation upon rails, said vehicle having a framework, of a plurality of flanged sliding shoes attached to said framework adapted to engage the rails when the wheels leave the said rails, and a flat flangeless sliding shoe for the other side of said vehicle.

2. In combination with a wheeled vehicle adapted for operation upon rails, said vehicle having a framework, of a plurality of flanged sliding shoes attached to said framework adapted to engage the rails when the wheels leave the said rails, said flanged shoes being mounted to the side of certain wheels of said vehicle, and a flat flangeless sliding shoe for the other side of said vehicle.

3. In a wheeled vehicle adapted for operating upon rails, the combination with a substantially rectangular framework, of means for mounting wheels to said framework, vertical members attached to said framework, and a flanged sliding shoe attached to said vertical members, sidewardly of the wheels, said shoe consisting of a shoe portion having upwardly extending mounting ends, said vertical members extending between the converging ends of said shoe.

4. In a wheeled vehicle adapted for operating upon rails, the combination with a substantially rectangular framework, of means for mounting wheels to said framework, vertical members attached to said framework, a flanged sliding shoe attached to said vertical members, sidewardly of the wheels, said shoe consisting of a shoe portion having upwardly extending mounting ends, said vertical members extending between the converging ends of said shoe, and means for securing the upper extremities of said shoe and said vertical member together.

5. In a wheeled vehicle adapted for operating upon rails, the combination with a substantially rectangular framework, of means for mounting wheels to said framework, vertical members attached to said framework, a flanged sliding shoe attached to said vertical members, sidewardly of the wheels, said shoe consisting of a shoe portion having upwardly extending mounting ends, said vertical members extending between the converging ends of said shoe, means for securing the upper extremities of said shoe and said vertical member together, and means for securing the lower extremity of said vertical member and the lower extremity of one arm of said shoe together.

6. In a wheeled vehicle adapted for operating upon rails, the combination with a substantially rectangular framework, of means for mounting wheels to said framework, vertical members attached to said framework, and a flanged sliding shoe attached to said vertical members, said shoe having a shoe portion, and upwardly extending arms, said vertical members extending along one arm of said shoe.

7. In a wheeled vehicle adapted for operating upon rails, the combination with a substantially rectangular framework, of means for mounting wheels to said framework, vertical members attached to said framework, a flanged sliding shoe attached to said vertical members, said shoe having a shoe portion, and upwardly extending arms, said vertical members extending along one arm of said shoe, and means for securing the upper extremities of said shoe and said vertical member together.

8. In a wheeled vehicle adapted for operating upon rails, in combination with a substantially rectangular framework, of means for mounting wheels upon said framework, a flanged sliding shoe provided at one side of said vehicle and attached to said framework, and a substantially U shaped sliding shoe for the other side of said framework having its free ends secured to the adjoining sides of said framework.

In witness whereof, I hereunto subscribe my name this sixteenth day of December, A. D., 1911.

ARTHUR G. NUTTING.

Witnesses:
HARRY J. DEUEL,
F. L. BAYARD.